US008930560B2

(12) United States Patent
Whitehead et al.

(10) Patent No.: US 8,930,560 B2
(45) Date of Patent: Jan. 6, 2015

(54) RE-DIRECTING VIDEO ACCORDING TO A STANDARD PROTOCOL

(75) Inventors: Steven D. Whitehead, Hudson, MA (US); William E. Garrett, Framingham, MA (US); Christopher M. Martin, Walpole, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1498 days.

(21) Appl. No.: 11/483,459

(22) Filed: Jul. 10, 2006

(65) Prior Publication Data

US 2008/0010380 A1 Jan. 10, 2008

(51) Int. Cl.
| G06F 15/16 | (2006.01) |
| G06F 15/173 | (2006.01) |
| H04L 29/06 | (2006.01) |
| H04N 21/258 | (2011.01) |
| H04N 21/24 | (2011.01) |
| H04N 21/61 | (2011.01) |

(52) U.S. Cl.
CPC ........ *H04L 65/4084* (2013.01); *H04L 65/1006* (2013.01); *H04L 65/1069* (2013.01); *H04N 21/25816* (2013.01); *H04L 65/1073* (2013.01); *H04N 21/2408* (2013.01); *H04N 21/6125* (2013.01)
USPC ........... 709/231; 709/203; 709/219; 709/228; 709/230; 709/232; 709/239

(58) Field of Classification Search
USPC ................. 709/230–232, 219, 203, 228, 239; 725/25–31, 78, 80–82, 85, 133, 141, 725/153
See application file for complete search history.

(56) References Cited

U.S. PATENT DOCUMENTS

| 6,505,348 B1* | 1/2003 | Knowles et al. ............... 725/49 |
| 6,598,088 B1* | 7/2003 | Lynch et al. ................. 709/238 |
| 7,454,510 B2* | 11/2008 | Kleyman et al. ............. 709/231 |
| 7,526,789 B2* | 4/2009 | Bizet ........................... 725/119 |
| 7,707,614 B2* | 4/2010 | Krikorian et al. ............. 725/94 |
| 2002/0078193 A1* | 6/2002 | Baumeister et al. .......... 709/223 |
| 2002/0099842 A1* | 7/2002 | Jennings et al. .............. 709/231 |
| 2003/0154268 A1* | 8/2003 | Sato ............................. 709/223 |
| 2005/0028223 A1* | 2/2005 | Yanoguchi et al. ........... 725/135 |
| 2006/0095401 A1* | 5/2006 | Krikorian et al. ................. 707/1 |
| 2006/0095471 A1* | 5/2006 | Krikorian et al. .......... 707/104.1 |
| 2008/0288458 A1* | 11/2008 | Sun et al. ......................... 707/3 |

OTHER PUBLICATIONS

RFC 3261 ("SIP: Session Initiation Protocol", Request for Comments: 3261, Jun. 2002, from http://www.ietf.org/rfc/rfc3261.txt).*
RFC 4566, "SDP: Session Description Protocol", Network Working Group, Request for Comments: 4566, Jul. 2006.*
U.S. Appl. No. 11/947,898, filed Nov. 30, 2007, entitled Standards Enabled Media Streaming.
3GPP TS 23.228 V7.0 (Jun. 2005), 3GPP Organizational Partners, Copyright 2005.

(Continued)

*Primary Examiner* — Edward Kim

(57) ABSTRACT

A client device is registered with a registrar in a network. A graphical user interface that includes a menu for selecting video content is displayed on the client. A request is made via a network according to a standard protocol for video content from a server that is registered with the registrar. Further, video content is received from the server.

22 Claims, 3 Drawing Sheets

(56) References Cited

OTHER PUBLICATIONS

Rosenberg et al., "An Offer/Answer Model with the Session Description Protocol (SDP)", Network Working Group, Request for Comments: 3264, Jun. 2002.

Schulzrinne et al., "Real Time Streaming Protocol (RTSP)", Network Working Group, Request for Comments: 2326, Apr. 1998.

Garcia-Martin et al., "Private Header (P-Header) Extensions to the Session Initiation Protocol (SIP) for the 3rd-Generation Partnership Project (3GPP)", Network Working Group, Request for Comments: 3455, Jan. 2003.

Rosenberg et al., "SIP: Session Initiation Protocol", Network Working Group, Request for Comments: 3261, Jun. 2002.

Handley et al., "SIP: Session Initiation Protocol", Network Working Group, Request for Comments: 2327, Apr. 1998.

* cited by examiner

RE-DIRECTING VIDEO ACCORDING TO A STANDARD PROTOCOL

BACKGROUND INFORMATION

Subscriptions to video services generally provide video services at a predetermined geographic location associated with the subscription, such as a subscriber's home. For example, video services may be provided to subscribers via a video distribution network connected to cable inputs in a receiver known as a "set top box" (STB) at the predetermined geographic location. However, a subscriber for video services may find it desirable to obtain video services at locations other than the predetermined location associated with the subscription. And in fact, using an approach sometimes referred to as "place-shifting" video services, it is possible to allow a subscriber to access subscribed-for video services at potentially unlimited number of locations via a network such as the Internet.

Present approaches for place-shifting video services suffer from a number of shortcomings. At present, place-shifting video services generally requires a subscriber to video services to purchase one or more specialized pieces of hardware that is typically attached to the subscriber's STB to provide place-shifting. Further, a remote video device, such as a personal computer, usually requires proprietary multimedia player software in order to display video services. By operating over public networks such as the Internet, which transports digital data on a "best efforts" basis, present place-shifting services suffer from the limitations of such networks and are not able to provide video services to a subscriber according to standards for a quality of service (QoS). However, because present approaches to place-shifting generally make use of proprietary signaling protocols, it is generally difficult, if not practically impossible, to integrate place-shifting with other existing telecommunications infrastructures.

Accordingly, it would be advantageous to integrate place-shifting capabilities directly into subscribers STBs. It would further be advantageous to use a standard signaling protocol that would not require proprietary hardware and software. It would further be advantageous to be able to provide place-shifting using existing telecommunications infrastructures other than the Internet, thereby providing place-shifting according to a predetermined QoS and also leveraging existing infrastructure. It would further be beneficial to be able to provide place-shifting in conjunction with other network services, such as internet protocol (IP) telephony.

DETAILED DESCRIPTION OF THE PREFERRED EMBODIMENTS

Overview

Figure 1:
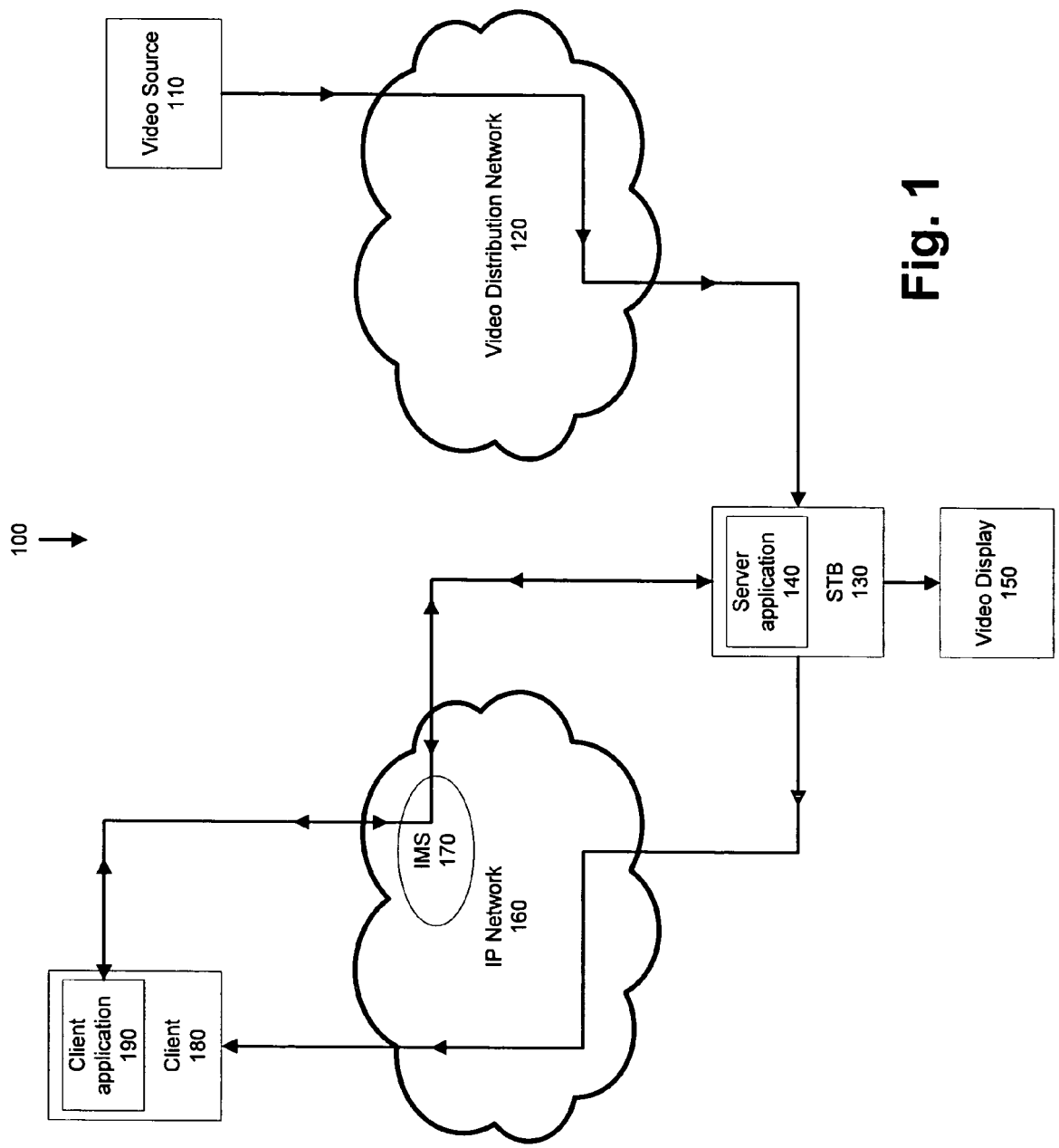
FIG. 1 illustrates a system 100 for providing video services, according to an embodiment.

FIG. 1 illustrates a system 100 for providing video services, according to an embodiment. Signals from video source 110 are transmitted through video distribution network 120 and received by set top box (STB) 130. Video source 110 is a video source such as a head end in a cable television network, providing either analog or digital video signals. Set top box 130 generally includes an input jack and receives signals. In one exemplary embodiment, the received signals are digital, and may have been converted from analog signals in network 120 in any of the various ways for performing analog to digital conversions known to those skilled in the art.

In another exemplary embodiment, any digital and analog conversions may be performed within STB 130. In general it is to be understood that video distribution network 120 could provide video data to STB 130 in any of a variety of ways, e.g., asynchronously, point-to-point, multicast, etc. Further, video data could be provided to STB 130 from sources other than video source 110, such as a digital video recorder (DVR) included within or attached to STB 130, some other home media storage device accessible via a home network, or even a content server remote from STB 130, but accessible through a network such as network 160, which is illustrated in FIG. 1 as an exemplary internet protocol (IP) network.

STB 130 is a computing device that includes server application 140. STB 130 is generally attached to a television set or video receiver belonging to a subscriber for video services that are delivered via video distribution network 120. STB 130 may provide a variety of functions, including allowing a user to select video channels, purchase pay-per-view video, see a directory of programs available for viewing and/or pay-per-view purchase, etc. In many embodiments, STB 130 includes one or more output jacks and is configured to provide video outputs, such as RGB outputs, S-video outputs, or composite video outputs to video display 150. Display 150 in many embodiments is a conventional or high definition television receiver or display monitor.

Server application 140 generally includes computer software stored in a computer-readable medium such as a computer memory included in STB 130, and executed by a processor included in STB 130. However, embodiments are possible in which server application 140 is included on a computing device separate from but in communication with STB 130. Server application 140 receives requests for video content from client 180 through network 160 and IP Multimedia Subsystem (IMS) 170, which is included within network 160, when that network is an IP network. Client 180 includes client application 190 through which users may make requests for video content. In response to such requests, server application 140 causes STB 130 to transmit video to client 180 via IP network 160.

Network 160 may be the Internet. Moreover, embodiments are possible in which network 160 is a packet-switched network using protocols other than IP.

IMS 170 is known to those skilled in the art for providing an architecture in an IP network facilitating the provision of multimedia services to users at network devices, such services including photographs, video, instant messages, telephony, etc. IMS is discussed in a variety of specifications, such as 3rd Generation Partnership Project, Technical Specification Group Services and System Aspects; IP Multimedia Subsystem (IMS), Stage 2 (Release 7), 3GPP TS 23.228 V7.0.0 (2005-06), fully incorporated herein by reference and available from the 3rd Generation Partnership Project of Valbonne, France. IMS 170 uses session initiation protocol (SIP) to establish communications for providing video services from STB 130 to client 180. SIP is well known to those skilled in the art and is discussed in, among other publications, J. Rosenberg. et al., RFC 3261—SIP: Session Initiation Protocol (June 2002), fully incorporated herein by reference, published by the Internet Society of Reston, Va., and available on the Word Wide Web at the faqs.org website. Other Requests for Comment relating to SIP published by the Internet Society are known to those skilled in the art, including M. Garcia-Martin et al., RFC 3455—Private Header (P-Header) Extensions to the Session Initiation Protocol (SIP) for the 3rd-Generation Partnership Project (3GPP) (January 2003) and J. Rosenberg et al., RFC 3264—An Offer/Answer Model with Session Description Protocol (SDP) (June 2002), which are also fully incorporated herein by reference. SDP is described in M. Handley and V. Jacobson, RFC 2327—SDP: Session Description Protocol (April 1998), also published by the Internet Society and also fully incorporated herein by reference.

Client 180 hosts client application 190, which allows a user to request and view video received in STB 130. Client 180 may include any one of a number of computing devices known to those skilled in the art, including, without limitation, a computer workstation, a desktop, notebook, laptop, or handheld computer, or some other computing device known to those skilled in the art, such as a Java-enabled cellular telephone or similar device. Computing devices such as the foregoing may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. While STB 130 generally is a specialized device for receiving video signals from video source 110 via network 120 and providing video signals to display 150, it is to be understood that STB 130 may be a computing device such as one of those enumerated above, so long as the computing device is capable of receiving video signals from network 120 and providing signals to display 150, as well as network 160.

STB 130 and client 180 generally each include instructions executable by one or more computing devices such as those listed above. For example, server application 140 and client application 190 generally comprise one or more sets of computer executable instructions for performing a variety of tasks. Such tasks may include using SIP to negotiate a session for sending and receiving a video stream, establishing such a session, and starting the transmission of the video stream. In cases in which STB 130 is sending stored video content, e.g., from a DVR, to client 180, server application 140 and client application 190 may include instructions for establishing a control channel according to Real Time Streaming Protocol (RTSP), described in H. Schulzrinne, RFC 2326—Real Time Streaming Protocol (RTSP) (April 1998), published by the Internet Society of Reston, Va. and available on the world wide web at the faqs.org website, and fully incorporated by reference herein. It is possible to implement extensions to SIP that provide for RTSP. Further, STB 130 and client 180 may include hardware and/or software for decoding and/or encoding a stream of video data. Those skilled in the art will understand that the need for such hardware and/or software will depend on the format of video data provided to and by STB 130. Moreover, known media players, such as the Real Player, provided by RealNetworks, Inc., of Seattle, Wash., or the Windows Media Player, provided by Microsoft Corp. of Redmond, Wash., may be included on client 180 and used in conjunction with client application 190 to display video accessed from STB 130.

Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 2B:
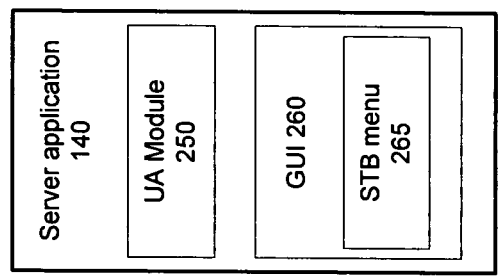
FIG. 2B illustrates a server application, according to an embodiment.
Figure 2A:
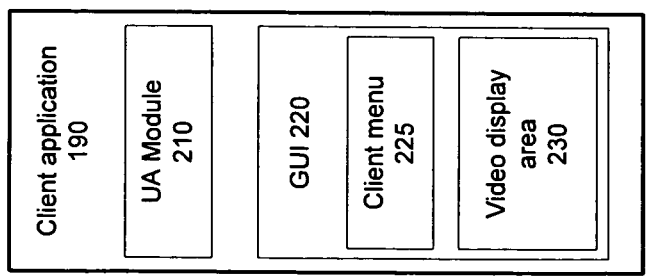
FIG. 2A illustrates a client application, according to an embodiment.

FIG. 2A provides a more detailed illustration of client application 190. Client application 190 allows users at client 180 to request and receive video content from STB 130. Client application 190 includes a SIP user agent module 210 that at a minimum implements the functionality specified for a SIP user agent in RFC 3261. Among other things, user agent module 210 implements functions to allow client 180 to register itself with a SIP registrar, as specified in RFC 3261. For example, a SIP registrar is generally included in the infrastructure of IMS 170. User agent module 210 also implements functions to generate, send, and receive, as appropriate, requests and responses as specified in RFC 3261 as well as the IMS specification.

Client application 190 further includes a user interface, generally graphical user interface (GUI) 220, for allowing users to request content from STB 130, and for displaying requested content that is received at client 180. GUI 220 is displayed on a display included in or associated with client 180, and may be accessed through input devices included in or associated with client 180, such as a computer keyboard, touchpad, mouse or other pointing device, etc. It is to be understood that embodiments are possible in which client application 190 does not include a graphical user interface but rather includes some other type of interface such as a text-based interface.

GUI 220 includes client menu 225 that presents options that a user may select to view content available from STB 130, and to request such content from STB 130. Menu 225 could take a variety of forms, and present a variety of options. For example, in one embodiment, menu 225 presents a list of predetermined channels of video content provided by STB 130 from which a user may select a channel for viewing. Such channels could be simply listed, or could be presented hierarchically in a tree or the like. Further, menu 225 could be populated by a media guide downloaded from STB 130. In such event, SIP may be used to establish a session for downloading the media guide, it may be provided in a data stream sent according to hyper-text transfer protocol (HTTP) or the like. Generally selection of video content from menu 225 causes client application 190 to generate a SIP INVITE message, discussed in more detail below. In addition to menu 225, GUI 220 generally includes arrows or some other control for changing channels. Further, controls for controlling streaming media, such pause, play, etc., may be included.

GUI 220 further includes video display area 230 for displaying video received from STB 130.

FIG. 2B provides a more detailed illustration of server application 140. Server application 140 and/or STB 130 each or collectively are sometimes referred to as a "place-shifting server" because server application 140 receives requests from client 180 for video, and responds to such requests, thereby allowing users to view video received in STB 130 at locations other than the place where STB 130 is located. That is, client 180 may be located in a place remote from STB 130, and a user may view video received in STB 130 via network 120 on client 180.

Accordingly, in certain embodiments, to support place-shifting of video content, server application 140 includes a SIP user agent module 250 that at a minimum implements the functionality specified for a SIP user agent in RFC 3261. Among other things, user agent module 250 implements functions to allow STB 130 to register itself with a SIP registrar, as specified in RFC 3261. As mentioned above, a SIP registrar is generally included in the infrastructure of IMS 170. Server application 140 also implements functions to generate, send, and receive, as appropriate, requests and responses as specified in RFC 3261.

Server application 140 further includes a user interface, generally graphical user interface (GUI) 260 for allowing users to configure STB 130. GUI 260 may be displayed on video display 150 and accessed using an infrared (IR) control device such as is known in the art, although embodiments are possible in which GUI 260 is accessed using a computer keyboard, mouse or other pointing device, etc.

GUI 260 includes STB menu 265 providing options that a user may select to choose devices that may receive content from STB 130, and also to select the content that may be received by particular devices. For example, as explained below, both STB 130 and client 180 register with a SIP registrar. Accordingly, a user of STB 130 could be provided with a menu to select SIP addresses of record, preferably through identifiers associated with each address of record, from which STB 130 may accept requests for video content. It is to be understood that embodiments are possible in which server application 140 does not include a graphical user interface but rather includes some other type of interface such as a text-based interface.

Process Flows

Figure 3:
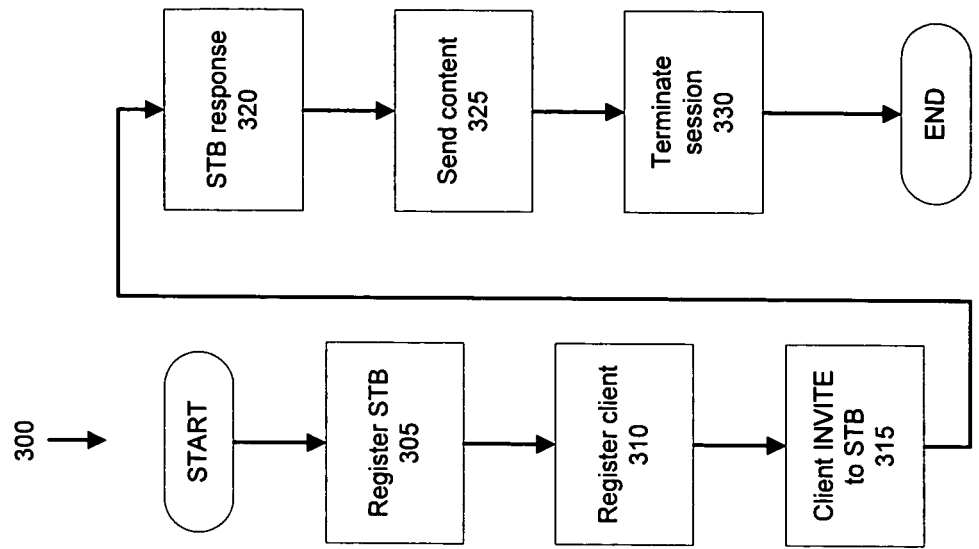
FIG. 3 illustrates a process flow for requesting content from a set top box, according to an embodiment.

FIG. 3 illustrates a process 300 for requesting content from STB 130, according to an embodiment.

In step 305, STB 130 registers itself with the registrar in network 160, e.g., in IMS 170.

Next, in step 310, upon instantiation of client application 190, client 180 registers itself with a registrar in network 160, e.g., in IMS 170.

Next, in step 315, upon selection of a user in GUI 220 of a menu option for receiving content from STB 130, client application 190 included in client 180 sends an INVITE request to STB 130. Session description protocol (SDP) may be used to transport metadata including information about video content. For client 180 to request video content from STB 130, client application 190 generates a SIP INVITE message. Such a SIP INVITE message may include an "offer" formatted according to SDP as described in RFC 3264. Generally this offer will specify parameters including the type of media being requested (video, audio, etc.), transport protocols to be used (e.g., UDP), the format of the media being requested (e.g., MPEG-2. MPEG-4, etc.), an address for the media to be received, e.g., an IP address for client 190, and a transport port for the media, e.g., a port on client 190. Such parameters may be provided as options in GUI 220, or may be specified in the program code for client application 190.

Next, in step 320, server application 140 sends a response to client application 190. Server 140 generally responds to the INVITE message sent in step 315 with a SIP ANSWER, e.g., 200 OK, message that may further negotiate some of the foregoing parameters, to which client application 190 in turn responds with a SIP ACK message. Further, in cases in which RTSP is desirable because stored content is being requested from STB 130, the INVITE message may also include a request and parameters for setting up a control channel that is logically coupled to the data channels providing requested video content.

It is to be understood that the negotiation of a SIP session could occur differently than described with respect to steps 315 and 320. For example, it is possible for client 180 to send a SIP INVITE message that essentially requests that STB 130 provide session parameters such as available media formats, possible transport protocols, etc., whereupon client 180 responds with a SIP message selecting the options provided by STB 130.

Next, in step 325, STB 130 sends content to client 180.

Next, in step 330, the session initiated in step 315 is terminated, e.g., using a SIP BYE message and its associated signaling sequence.

Following step 330, process 300 ends.

Figure 4:
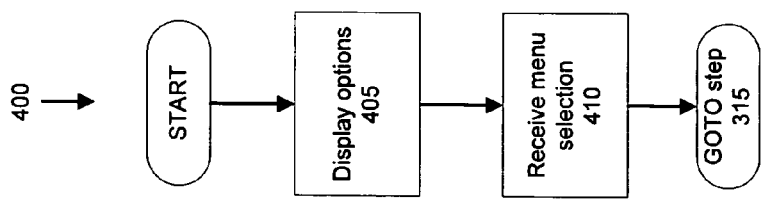
FIG. 4 illustrates a process for using a client menu, according to an embodiment.

FIG. 4 illustrates a process 400 for using menu 225, according to an embodiment.

In step 405, client application 190 causes client 180 to display menu options. Such menu options in one embodiment include a list of predetermined channels of video content provided by STB 130 from which a user may select a channel for viewing, as described above.

Next, in step 410, client 180 receives input, e.g., by a user action on a keyboard or pointing device attached to client 180. Such input in an embodiment includes a user selection of a video channel for viewing.

Next, process 400 invokes step 315 of process 300, and continues as described above with reference to process 300 beginning with step 315.

Figure 5:
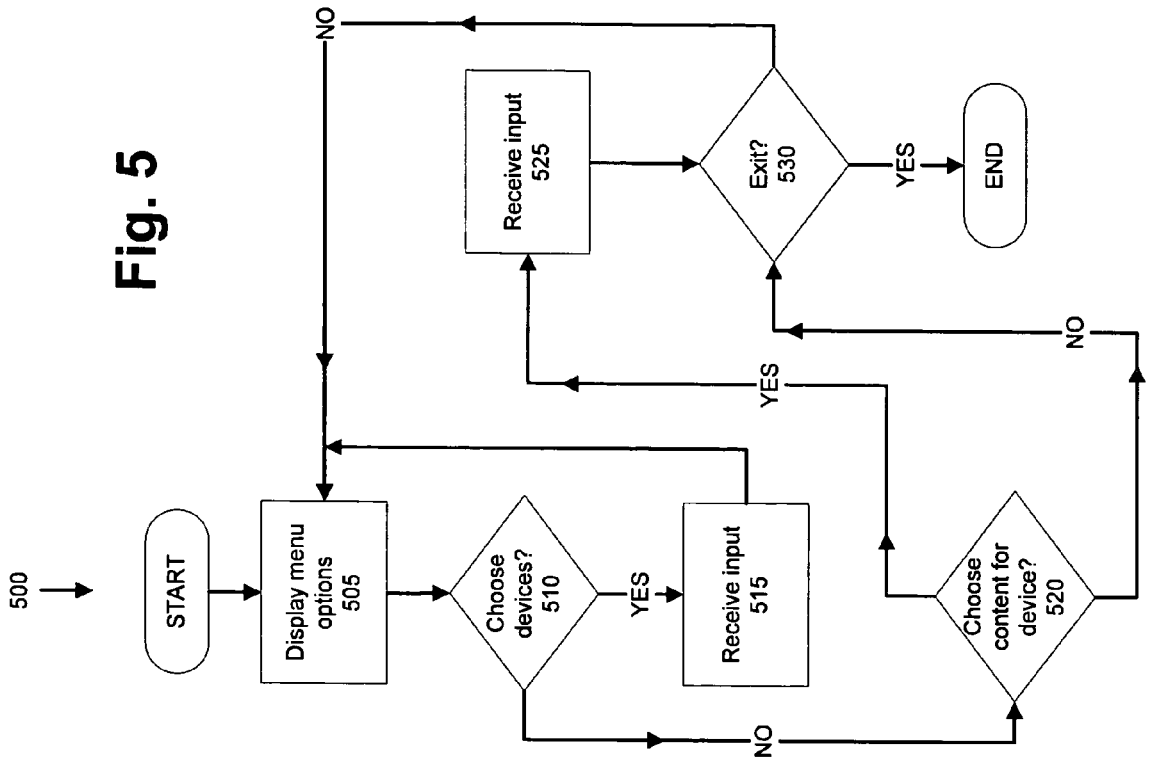
FIG. 5 illustrates a process for using a set top box menu, according to an embodiment.

FIG. 5 illustrates a process 500 for using menu 265, according to an embodiment.

In step 505, a display associated with STB 130, e.g., a television or video monitor attached to STB 130, displays menu 265. In an embodiment menu 265 includes an option to specify a client or clients 180 to which STB 130 may provide video content, e.g., by specifying client or clients 180 associated with SIP addresses of record with which SIP may be used to initiate sessions and to which video may be provided. Menu 265 may also include an option whereby particular content, e.g., certain video channels, may be specified for a particular client or clients 180. Menu 265 also generally includes an option to exit menu 265 for a more general menu included in STB 130 or to view video content, e.g., a menu for selecting video channels for viewing, pay-per-view content for downloading, etc.

Next, in step 510, server application 140 determines whether input has been received indicating that a user would like to specify client or clients 180 that may receive video content from STB 130. If so, process 500 proceeds to step 515. Otherwise, process 500 proceeds to step 520.

In step 515, server application 140 receives input indicating client or clients 180 to receive video content from STB 130. Such input may be received in a variety of known ways, e.g., by a user identifying client or clients 180 by name, e.g., clients 180 associated with SIP addresses of record, by using a cursor controlled with a pointing device to mark names in list of one or more clients 180 presented in GUI 260. Following step 515, process 500 returns to step 505.

In step 520, server application 140 determines whether input has been received indicating that a user would like to specify video content that client or clients 180 may receive from STB 130. If so, process 500 proceeds to step 525. Otherwise, process 500 proceeds to step 530.

In step 525, server application 140 receives input indicating particular video content that a particular client or clients 180 will be permitted (or, in some embodiments, forbidden) to receive from STB 130. Again, such input may be received in a variety of known ways, e.g., by a user identifying content that a client or clients 180 may receive from STB 130 by marking such client or clients 180 and such video content by using a known pointing device to mark items in a list or lists presented in GUI 260. For example, clients 180 may be identified by name, by a network address, by a SIP address of record, etc. Video content may be identified by a number for a video channel, the name of a video program, etc. Following step 525, process 500 proceeds to step 530.

In step 530, server application 140 determines whether it has received input indicating that a user wishes to exit menu 265. If yes, process 500 ends. Otherwise, process 500 returns to step 505.

Because the IMS architecture includes SIP proxies, it is further advantageously possible to use SIP to integrate with other IMS services and to signal for QoS. For example, as SIP messages traverse SIP proxies within the IMS, it is possible to use the proxies to request QoS information. Further, because other media services are provided through the IMS, such as messaging, telephony, etc., it is advantageously possible for client application 140 to be integrated with applications that provide such services, or for such services to be provided through a common interface with client GUI 220. For example, a user watching video on a cellular telephone could have the video automatically paused when an incoming call is received.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. For example, although embodiments are described above with reference to STB 130, it should be understood that server application 140 could be included in embodiments including hardware devices other than STB 130. Further, although embodiments used herein disclose use of SIP, it is to be understood that some other standard protocol for initiating sessions could be used in other embodiments.

The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method, comprising:
receiving a video signal at a set top box of a user,
   the set top box being located at a first geographic location,
   the video signal being received, via a first network, from a source associated with a cable television network,
   the set top box being included in a home network of the user;
providing for display, by the set top box, a user interface that includes one or more options for providing video content, associated with the received video signal, from the set top box to a remote device of the user,
   the remote device being located at a second geographic location that is remote from the first geographic location;
receiving at the set top box and from the user via an option of the one or more options:
   input identifying the remote device, and
   input identifying first video content, of the video content associated with the received video signal, that the remote device is not authorized to receive from the set top box,
      the input identifying the remote device including an Internet Protocol (IP) address of the remote device;
receiving, at the set top box and from the remote device, a request to provide the video content, associated with the received video signal, from the set top box to the remote device,
   the request being received via a second network that is different than the first network, and
   the request including information identifying the remote device,
      the information identifying the remote device including the IP address of the remote device;

establishing, by the set top box and via the second network, a communications session between the set top box and the remote device, based on receiving the request for the video content;

determining, by the set top box, that the requested video content is to exclude the first video content based on:
   the IP address of the remote device included in the information identifying the remote device,
   the IP address of the remote device included in the input identifying the remote device, and
   the input identifying the first video content; and providing, by the set top box and via the second network, the video content, from the set top box and to the remote device, after establishing the communications session between the set top box and the remote device,
   the provided video content excluding the first video content based on determining that the requested video content is to exclude the first video content.

2. The method of claim 1, where the request is received, via the second network, according to session initiation protocol (SIP), and
   where the communications session is established according to SIP.

3. The method of claim 1, where receiving the request comprises receiving one or more first session initiation protocol (SIP) messages via an IP Multimedia Subsystem (IMS), the method further comprising:
   sending, via the IMS and to the remote device, one or more second SIP messages based on the one or more first SIP messages,
      the one or more second SIP messages including information identifying a plurality of media formats and a plurality of transport protocols relating to providing video content from the set top box device to the remote device,
      the information identifying the plurality of media formats and the plurality of transport protocols being provided to the remote device for display to the user; and
   receiving, from the remote device and via the IMS, one or more third SIP messages including information identifying a particular media format, of the plurality of media formats, and a particular transport protocol of the plurality of transport protocols,
   where the one or more third SIP messages are received based on sending the one or more second SIP messages, and
   where providing the video content includes providing the video content in the particular format using the particular transport protocol.

4. The method of claim 3, where the one or more first SIP messages include a SIP INVITE message that includes parameters formatted according to session description protocol (SDP), and
   where the one or more second SIP messages include a SIP ANSWER message.

5. The method of claim 1, where the first network includes a video distribution network,
   where the second network includes an IP network, and
   where the method further comprises:
      using, by the set top box, a standard stream control protocol to manage streaming of the video content via the IP network from the set top box to the remote device.

6. The method of claim 1, where the option corresponds to a first option to identify remote devices to which video services are to be provided, and
   where the one or more options further include at least one of a second option to provide content that is controlled according to Real Time Streaming Protocol (RTSP) or a third option to use the set top box to access content stored on a remote server,
   the method further comprising:
      receiving, at the set top box via the first option, another input identifying another remote device, the other input indicating that:
         the other remote device is authorized to receive the first video content, and
         the other remote device is unauthorized to receive second video content of the video content, that is provided to the remote device,
         the second video content being different than the first video content;
      receiving, at the set top box and from the other remote device, a second request for providing the video content from the set top box to the other remote device via the second network,
         the second request being received via the second network and including information identifying the other remote device; and
      providing, via the second network, the video content from the set top box and to the other remote device,
         where, based on the other input identifying the other remote device and the information identifying the other remote device, the video content, provided to the other remote device, includes the first video content and excludes the second video content.

7. The method of claim 1, where the source includes a head end in the cable television network,
   where the first network includes a video distribution network,
   where the second network includes a packet switched network, and
   where the method further comprises:
      using, by the set top box, a standard stream control protocol to manage streaming of the video content via the packet switched network from the set top box to the remote device.

8. A non-transitory computer-readable medium storing instructions, the instructions comprising:
   one or more instructions which, when executed by at least one processor of a set top box of a user, cause the at least one processor to:
      receive, via a first network, a video signal at the set top box,
         the set top box being located at a first geographic location,
            the first geographic location being associated with a home network of the user,
         the video signal being received from a source in a cable television network;
      provide for display, by the set top box, a user interface that includes options for providing video content, associated with the video signal, from the set top box to a remote device of the user,
         the remote device being located at a second geographic location that is remote from the first geographic location;
      receive, at the set top box, via an option of the options:
         first input, of the user, identifying first video content, of the video content, that the remote device is authorized to receive from the set top box, and
         second input, of the user, identifying the remote device, the second input including a network address of the remote device;

receive, at the set top box and from the remote device, a request for the video content,
the request being received via an IP Multimedia Subsystem (IMS) included in a second network that is different than the first network, and
the request including information, identifying the remote device, that includes the network address of the remote device;

establish, via the second network and based on receiving the request for the video content, a communications session between the set top box and the remote device;

send, to the remote device and via the IMS included in the second network, a message indicating that the request is accepted;

determine that the requested video content is to include the first video content based on:
the first input,
the network address of the remote device included in the second input, and
the network address of the remote device included in the information identifying the remote device; and provide, via the second network, the first video content from the set top box to the remote device for display to the user, based on:
determining that the requested video content is to include the first video content, and
the received request.

9. The non-transitory computer-readable medium of claim 8,
where the request is received according to session initiation protocol (SIP),
where the communications session is established according to SIP, and
where the first video content is provided, via the second network and using the communications session established according to SIP, from the set top box to the remote device.

10. The non-transitory computer-readable medium of claim 9, where the one or more instructions to receive the request comprise one or more instructions to receive one or more first SIP messages,
the one or more first SIP messages including parameters for setting up a channel that is logically coupled to one or more channels that provide the requested video content, and
where the one or more instructions to send the message comprise:
one or more instructions to send, to the remote device, one or more second SIP messages based on receiving the one or more first SIP messages.

11. The non-transitory computer-readable medium of claim 10, where the one or more first SIP messages include a SIP INVITE message that includes data formatted according to session description protocol (SDP), and
where the one or more second SIP messages include a SIP ANSWER message.

12. The non-transitory computer-readable medium of claim 8, where the first network includes a video distribution network,
where the second network includes a packet switched network, and
where the instructions further comprise:
one or more instructions to use a standard stream control protocol to manage streaming of the video content via the packet switched network.

13. The non-transitory computer-readable medium of claim 8, where the option corresponds to a first option to identify remote devices to which video services are to be provided, and
where the options further include at least one of a second option to provide content that is controlled according to Real Time Streaming Protocol (RTSP) or a third option to use the set top box to access content stored on a remote server,
the instructions further comprising one or more instructions to:
receive, at the set top box and via the first option, third input identifying second video content, of the video content, that the remote device is unauthorized to receive from the set top box,
the second video content being different than the first video content;
receive, at the set top box and using the first option, a fourth input indicating that another remote device is unauthorized to receive the first video content,
the fourth input including identification information of the other remote device;
prevent the second video content from being provided from the set top box to the remote device, based on the first input, the third input, and the information identifying the remote device;
receive, at the set top box and from the other remote device, a request for the video content to be provided from the set top box to the other remote device via the second network; and
provide, via the second network, the video content from the set top box to the other remote device,
where, based on the fourth input and the identification information of the other remote device, the video content, provided to the other remote device, excludes the first video content and includes the second video content.

14. The non-transitory computer-readable medium of claim 8, where the first network includes a video distribution network,
where the second network includes an Internet Protocol (IP) network, and
where the network address of the remote device includes an IP address.

15. A method, comprising:
displaying, by a client device of a user, a user interface that includes a menu for selecting one or more channels of video content provided by a network device of a first network,
the menu providing a list comprising the one or more channels of video content,
the client device being located at a first geographic location, and
the network device being located at a second geographic location that is remote from the first geographic location,
the first geographic location being associated with a home network of the user;
detecting, at the client device, selection of a particular channel of video content, from the one or more channels of video content, by a user of the client device;
sending, by the client device and based on receiving the selection of the particular channel of video content, a request for the particular channel of video content to the network device, the request being sent, to the network device, via an IP Multimedia Subsystem (IMS) included in a second network different than the first network, and the request including identification information of the client device, the identification information including a network address of the client device;

receiving, at the client device and from the network device via the IMS, a first message including information identifying media formats and transport protocols relating to providing the particular channel of video content from the network device to the client device;

providing, for display by the client device, the information identifying the media formats and the transport protocols;

detecting, at the client device, selection of information identifying a particular media format, of the media formats, and information identifying a particular transport protocol of the transport protocols;

sending, by the client device and to the network device via the IMS, a second message including the information identifying the particular media format and the information identifying the particular transport protocol;

receiving, at the client device and based on the request, content of the particular channel of video content from the network device, the content of the particular channel of video content being:

received in the particular media format via the second network, and transmitted by the network device using the particular transport protocol; and providing, by the client device, the received content of the particular channel of video content for display to the user of the client device.

16. The method of claim 15, where the second network includes an Internet Protocol network, where the request further includes information identifying a port of the client device associated with the particular channel of video content, and where the content of the particular channel of video content is received at the port of the client device.

17. The method of claim 15, where the menu includes:

an option to view a channel provided via a video distribution network, the first network including the video distribution network, the network device receiving the video content from a source in a cable television network, and an option to access content stored on a storage device associated with the network device.

18. The method of claim 15, where the request is sent according to session initiation protocol (SIP), and where the content of the particular channel of video content is received according to SIP.

19. The method of claim 18, where the request further includes information identifying a port of the client device associated with the particular channel of video content, where the content of the particular channel of video content is received at the port of the client device, where sending the request comprises sending one or more SIP messages, and where the one or more SIP messages include parameters formatted according to session description protocol (SDP).

20. The method of claim 19, where the request comprises a SIP INVITE message that includes data formatted according to session description protocol (SDP).

21. The method of claim 15, further comprising:

managing streaming of the content of the particular channel of video content using a standard stream control protocol.

22. The method of claim 1, where the request further includes first information identifying a type of video content and second information identifying a format of video content, and where providing, via the network, the requested video content includes providing the requested video content in the format identified by the second information, a type of the provided video content matching the type identified by the first information.

* * * * *